(12) United States Patent
Tierney et al.

(10) Patent No.: US 8,819,265 B2
(45) Date of Patent: Aug. 26, 2014

(54) MANAGING FLOW CONTROL BUFFER

(75) Inventors: James Tierney, Carp (CA); David Stuart, Almonte (CA); Bradley Venables, Nepean (CA)

(73) Assignee: Rockstar Consortium US LP, Plano, TX (US)

( * ) Notice: Subject to any disclaimer, the term of this patent is extended or adjusted under 35 U.S.C. 154(b) by 3591 days.

(21) Appl. No.: 10/744,769

(22) Filed: Dec. 22, 2003

(65) Prior Publication Data

US 2005/0138243 A1 Jun. 23, 2005

(51) Int. Cl.
*G06F 15/16* (2006.01)

(52) U.S. Cl.
USPC .......................................... 709/232; 709/224

(58) Field of Classification Search
USPC ............................ 709/223–224; 370/229–240
See application file for complete search history.

(56) References Cited

U.S. PATENT DOCUMENTS

| 6,515,963 | B1 * | 2/2003 | Bechtolsheim et al. | 370/229 |
| 6,959,002 | B2 * | 10/2005 | Wynne et al. | 370/412 |
| 7,088,710 | B1 * | 8/2006 | Johnson et al. | 370/357 |
| 2003/0066016 | A1 * | 4/2003 | Wehage | 714/781 |

OTHER PUBLICATIONS

Implementation Agreement: OIF-SP13-01.0; System Packet Interface Level 3 (SPI-3): OC-48 System Interface for Physical and Link Layer Devices. (Jun. 2000) Optical Internetworking Forum.
CSIX-L1: Common Switch Interface Specification-L1; (Aug. 5, 2000) CSIX.
UTOPIA 3 Physical Layer Interface; of-phy-0136.00 (Nov. 1999) The ATM Forum Technical Committee.
Frame-based ATM Interface (Level 3); af-phy-0143.000 (Mar. 2000) The ATM Forum Technical Committee.

* cited by examiner

*Primary Examiner* — Mohamed Ibrahim
(74) *Attorney, Agent, or Firm* — Withrow & Terranova, PLLC

(57) ABSTRACT

A count of data segments is maintained. The count includes data segments in a queue and data segments in transit between a data source and the queue. A flow of data segments from the data source is controlled, based on a value of the count.

27 Claims, 5 Drawing Sheets

MANAGING FLOW CONTROL BUFFER

BACKGROUND

Data communication networks use flow control to regulate the flow of data and reduce congestion at various points within a network. Flow control is used between nodes in a network by sending messages across a transmission medium indicating when a data packet is ready to be received. Flow control is also used between devices in a network by providing signals on control lines to indicate device status. Flow control between network devices typically includes monitoring the state of a data buffer to prevent overflow or underflow of the data buffer.

SUMMARY

According to an aspect of the invention a method includes maintaining a count of data segments, the count including data segments in a queue and data segments in transit between a data source and the queue, and controlling a flow of data segments from the data source, based on a value of the count.

Embodiments of the invention may include one or more of the following features.

The data source includes an input buffer.

The data segments in transit include data segments in a data pipeline of a device that reads data segments from the data source.

Maintaining the count includes incrementing the count when a data segment leaves the data source, and decrementing the count when a data segment leaves the queue.

The queue has at least as many elements as a maximum number of data segments in transit.

The queue has fewer elements than twice a maximum number of data segments in transit.

The queue is one of a plurality of queues stored in a memory buffer.

All of the queues have the same number of elements.

The method also includes maintaining counts of data segments for each of the queues.

Controlling the flow of data segments includes accepting a data segment for a designated one of the queues from the data source only when the count for the designated queue is less than a predetermined number.

The predetermined number is equal to the number of elements in the designated queue.

In general, in another aspect, the invention features an apparatus including a data source, a memory buffer in communication with the data source and storing a queue, and circuitry configured to maintain a count of data segments, the count including data segments in the queue and data segments in transit between the data source and the queue. The circuitry is further configured to control a flow of data segments from the data source, based on a value of the count.

In general, in another aspect, the invention features an system including a first buffer, a processor having a data pipeline in communication with the first buffer, a second buffer in communication with the processor and storing a queue, one or more communication lines in communication with the first buffer, a switch fabric in communication with the second buffer, and circuitry configured to maintain a count of data segments, the count including data segments in the queue and data segments in transit between the data source and the queue. The circuitry is further configured to control a flow of data segments from the data source, based on a value of the count.

In general, in another aspect, the invention features a processor including a data source, and circuitry configured to maintain a count of data segments, the count including data segments in a queue and data segments in transit between the data source and the queue. The circuitry is further configured to control a flow of data segments from the data source, based on a value of the count.

Embodiments of the invention may include one or more of the following advantages. The amount of buffer space used by the queues can be reduced by keeping track of the number of data segments in transit between a flow controllable source and a queue. Throughput of the traffic management system can be kept high by having enough buffer space to prevent underflow of the queues and/or to match flow control turn-on latency.

Other features and advantages of the invention will become apparent from the following description, and from the claims.

DESCRIPTION

Figure 1:
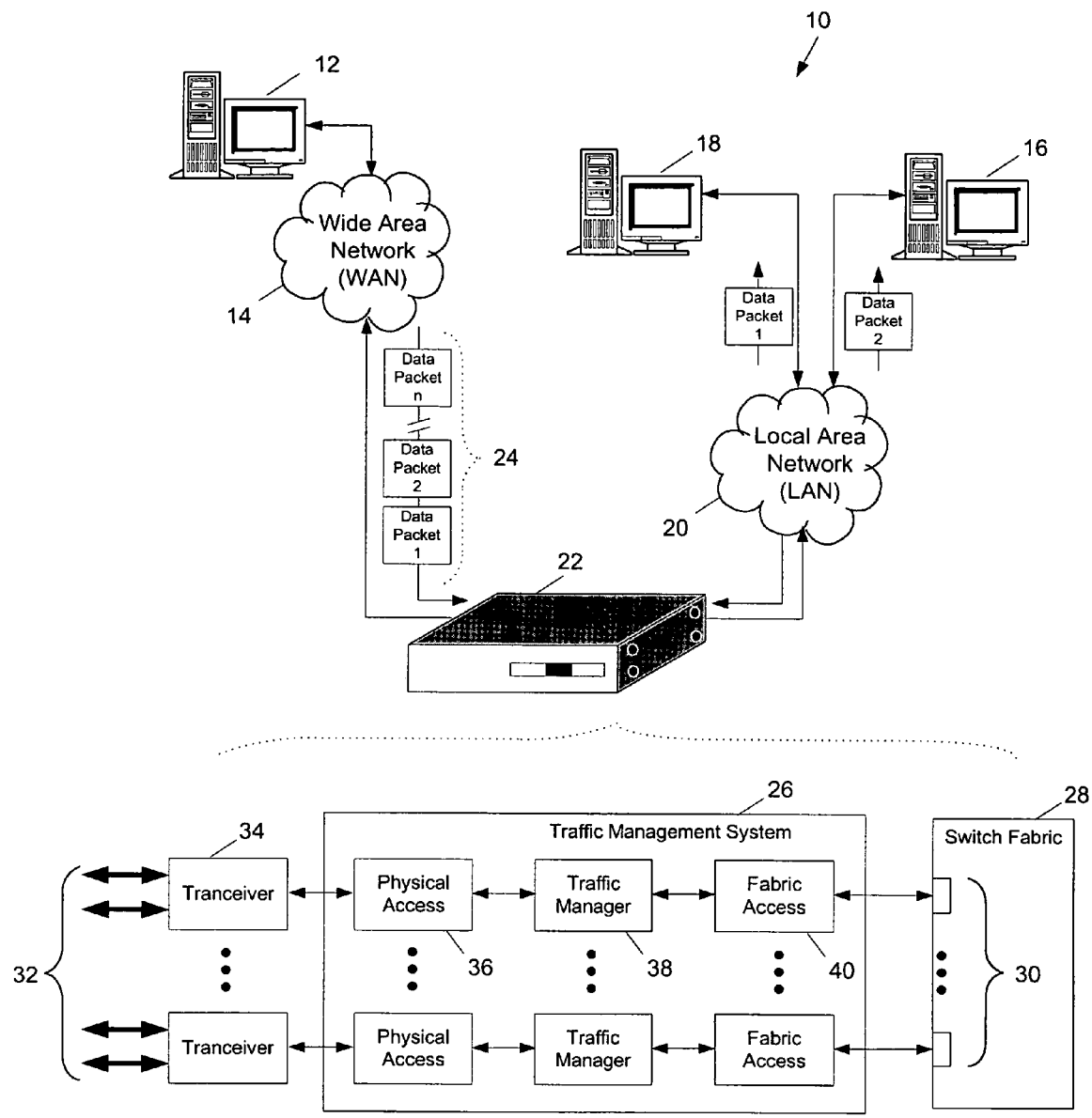
FIG. 1 is a block diagram depicting a system for transferring data packets between a WAN network and a LAN network.

Referring to FIG. 1, a system 10 for transmitting data packets from a computer system 12 to other computer systems 16, 18 via a wide area network (WAN) 14 and a local area network (LAN) 20 includes a network device 22 (e.g., a switch or a router) that collects a stream of "n" data packets 24, and prepares each of the data packets for transmission through the LAN 20 and delivery to the appropriate destination computer system 16 or computer system 18. In this example, "data packet_1" is transmitted from the computer system 12 for delivery to computer system 18 and "data packet_2" is transmitted for delivery to computer system 16. To deliver the data packets to the appropriate computer system, the network device 22 includes a traffic management system 26 that processes the data packet stream 24.

In this example, the traffic management system 26 uses a switch fabric 28 having a set of ports 30 (e.g., 16 or 32 ports) to switch traffic among a set of physical communication lines 32 (e.g., optical fiber or Ethernet cable). The ports handle different types of traffic. For example, some of the ports are "access ports" for connecting to LANs such as LAN 20, and some of the ports are "trunk ports" typically having a larger bandwidth than the access ports for connecting to WANs such as WAN 14. The ports are bidirectional, handling both incoming "ingress" traffic and outgoing "egress" traffic (on separate lines).

An incoming data packet is received over one of the communication lines 32 by a transceiver 34. In the case of an optical fiber channel, the transceiver converts an incoming optical bit stream into an electronic bit stream. A transceiver handles a single communication line or a set of multiple communication lines. Each of the communication lines 32 is bidirectional, i.e., having separate transmit and receive optical fibers.

In this example, the traffic management system 26 includes a physical access module 36 that processes the electronic bit stream for a transceiver 34. The physical access module 36 extracts packets from the electronic bit stream for a receive mode and combines packets into the proper format (e.g., SONET/SDH frames) for a transmit mode. The physical access module also buffers ingress and egress traffic.

Figure 2:
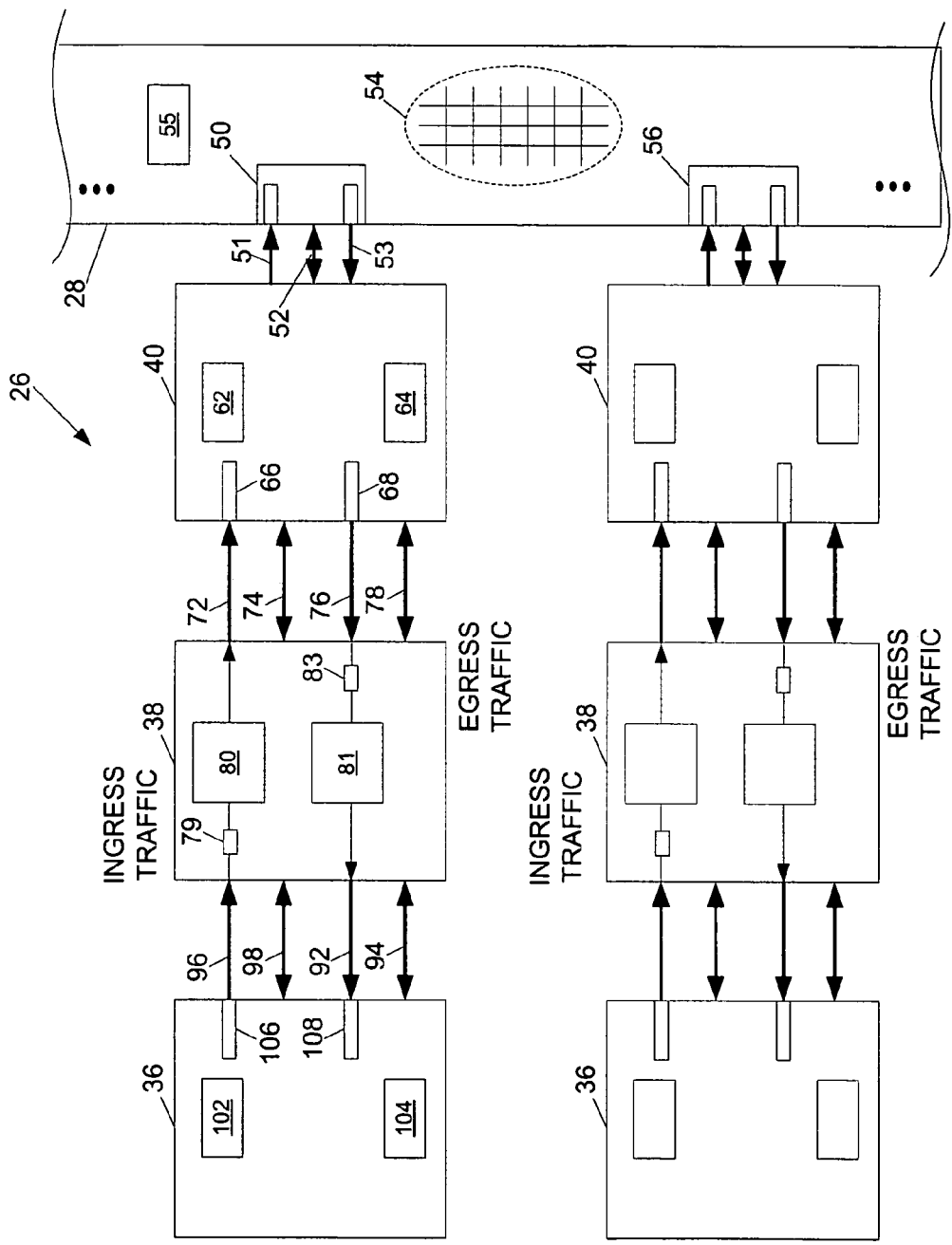
FIG. 2 is a block diagram of a traffic management system.

A traffic manager 38 handles tasks such as processing data packets received by the physical access module 36 according to a standard protocol (e.g., a data link layer protocol). The traffic manager 38 buffers data received from the physical access module 36 in an internal buffer 79 (FIG. 2). The traffic manager 38 forwards this data to the fabric access module 40 while respecting the flow control information received from the fabric access module 40. The traffic manager discards data if queues in its internal buffer 79 grow beyond set limits.

The traffic manager 38 includes a dedicated control unit, such as a network processing unit (NPU), to perform these tasks. The traffic manager 38 has a control unit 80 for the ingress traffic and a control unit 81 for the egress traffic. Alternatively, the traffic manager 38 can have separate control units for interfacing with the physical access module 36 and the fabric access module 40, or a single control unit. Other arrangements are possible.

The traffic management system 26 also includes a fabric access module 40 (for each port) for buffering data packets and transferring data packets and control signals between the traffic management system 26 and the switch fabric 28.

Referring to FIG. 2, a portion of the traffic management system 26 is shown interfacing with the switch fabric 28. The switch fabric 28 has a port 50 that is in communication with a fabric access module 40. The port 50 communicates with the fabric access module over an interface that includes an input bus 51 for ingress traffic, a control bus 52 for control signals, and an output bus 53 for egress traffic. The switch fabric 28 includes a control module 54 that handles reading and writing of control signals and directing traffic arriving on an input bus of one port (e.g., port 50) through a switching core 55 to an output bus of another port (e.g., port 56).

The fabric access module 40 for port 50 includes a control unit 62 (e.g., a processor or an application specific integrated circuit (ASIC)) that handles traffic and control signals for the ingress direction and a control unit 64 that handles traffic and control signals for the egress direction. Ingress traffic arriving from the traffic manager 38 on a bus 72 is stored in an input buffer 66. The input buffer 66 is divided into separate queues, one for each of the other ports of the switch fabric 28. This allocation of memory resources in the input buffer 66 is useful for preventing packets, which arrive for a busy port from using all of the buffer space in the input buffer 66, and consequently blocking traffic on other ports. An output buffer 68 stores packets from the switch fabric to send to the traffic manager 38 via bus 76. The output buffer 68 is divided into separate queues for multiple priority classes.

The physical access module 36 has a control unit 102 that handles traffic and control signals for the ingress direction and a control unit 104 that handles traffic and control signals for the egress direction. Ingress traffic arriving from a transceiver 34 is stored in an input buffer 106. A single transceiver 34 may handle multiple bidirectional communication lines 32. An output buffer 108 stores packets from the traffic manager 38 to send out on one of the communication lines 32 of the transceiver 34. The output buffer 108 is divided into separate queues for each of the communication lines 32.

The traffic manager 38 uses the control unit 80 to coordinate the flow of ingress traffic from the physical access module 36 to the fabric access module 40, and the control unit 81 to coordinate the flow of egress traffic from the fabric access module 40 to the physical access module 36. Ingress traffic is received over the bus 96, passed through a buffer 79 and a set of pipeline registers of the control unit 80, and output onto the bus 72. The traffic manager 38 uses control signals over control buses 98 and 74 to coordinate the transfer of data packets and to select a queue for each packet based on the packet's destination port. Egress traffic is received over the bus 76, passed through a buffer 83 and a set of pipeline registers of the control unit 81, and output onto the bus 92. The traffic manager 38 uses control signals over control buses 78 and 94 to coordinate the transfer of data packets and to select a queue for each packet based on the packet's destination communication line.

Figure 3:
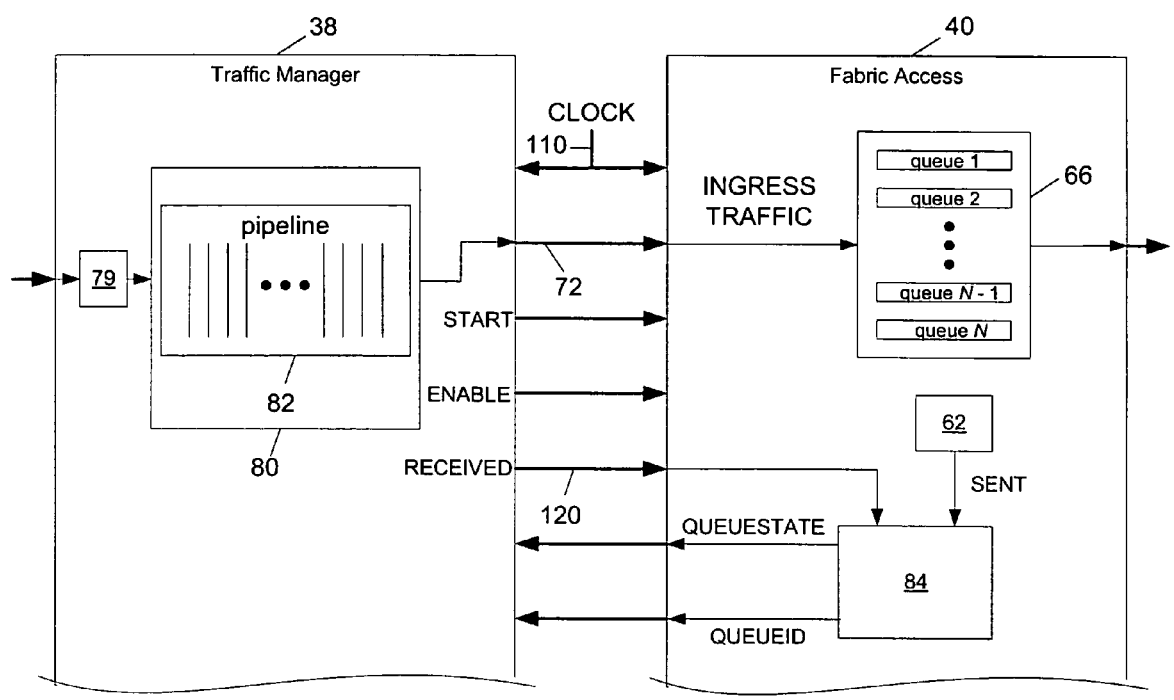
FIG. 3 is a block diagram of a portion of an interface between a traffic manager and a fabric access module for handling ingress traffic to a switch fabric.

Referring to FIG. 3, a portion of an interface between a traffic manager 38 and a fabric access module 40 for handling ingress traffic to the switch fabric 28 is shown. Since there are potentially many traffic managers 38 in the traffic management system 26 that are sending data packets to the switch fabric 28 (via a fabric access module 40), there may be congestion if a burst of data packets from many switch fabric ports are switched to the same switch fabric port output bus. Flow control is used to regulate traffic flow from the traffic manager 38, through the fabric access module 40, to the switch fabric 28.

The traffic manager 38 supports incremental flow control based on priority classes. If packets are labeled (e.g., by bits in a header) according to a set of priority classes (e.g., four priority classes labeled by two priority bits) then the traffic manager 38 can perform incremental flow control by turning off lower priority traffic while continuing to send higher priority traffic.

The fabric access module 40 stores data packets sent from the traffic manager 38 in a buffer 66 organized into a set of N queues. There is a separate queue for each destination port to which a packet may be switched and for each priority class. If the switch fabric 28 has P ports and there are C priority classes, then the number of queues in the buffer 66 is: N=CP (which includes queues for traffic that is not switched, or sent back out of the same switch fabric port that the traffic enters).

A CLOCK signal 110 is used to synchronize the transfer of a data packet over the data bus 72 in segments of up to 32 bits per clock cycle. The traffic manager 38 receives a packet in segments from the physical access module 36. Alternatively, the traffic manager may receive a packet and split the packet into the appropriate number of segments, or a small packet can be sent in a single segment. The fabric access module 40 transfers the segments to the switch fabric 28, and the switch fabric 28 switches the segments to the appropriate output port in the appropriate order for each packet.

The traffic manager 38 stores a flag for each queue indicating whether the switch fabric 28 is accepting segments for that queue (the flow control "XON state"), or is not accepting segments for that queue (the flow control "XOFF state"). The traffic manager 38 buffers data received from the physical access module 36 and forwards this data to the fabric access module 40 based on the flow control state for the respective queues. The flow control state (XON or XOFF) is determined by the traffic manager 38 based on flow control information, as described in more detail below.

When a queue for a packet is in the XON state, the traffic manager sends the packet segments to the fabric access module 40. The control unit 80 uses the pipeline 82 to increase the throughput of processed segments that are output onto the data bus 72 by the traffic manager 38. The pipeline has a number of stages S that is determined to suit the needs of the processing functions performed by the control unit 80 (e.g., 25 or 50 stages). When a queue for a packet is in the XOFF state, the control unit 80 stops reading packet segments from the internal buffer 79, and any segments remaining in the pipeline 82 continue to cycle out of the pipeline and into the appropriate queue of the fabric access module 40.

To transfer the segments of a packet from the traffic manager 38 to the fabric access module 40, the traffic manager 38 asserts the ENABLE signal to indicate that the traffic manager 38 is ready to transmit a packet to the fabric access module 40. The traffic manager 38 identifies a queue into which the packet is to be written, by sending an identifier over the data bus 72. The traffic manager 38 asserts the START signal to notify the fabric access module 40 to read the queue identifier on the data bus 72. The traffic manager 38 deasserts the START signal and sends segments of a data packet for the identified queue over the data bus 72 in subsequent clock cycles. The traffic manager 38 can pause the transfer of the segments of a packet by deasserting the ENABLE signal, and can resume the transfer by reasserting the ENABLE signal. The transfer of the packet is completed after an "end of packet" control signal (not shown) is received by the fabric access module 40.

The control unit 80 may have segments for more than one packet in its pipeline 82 at any given time. For example, the final segment of one packet and the first segments of another are typically in the pipeline 82 at the same time. Also, since the transfer of the segments of a packet can be paused before it is complete (e.g., due to congestion and a flag switching from the XON state to the XOFF state), there may be segments for more than two packets in the pipeline 82.

When there is no congestion and the switch fabric is accepting segments from the fabric access module 40, a segment written into a queue is typically sent to the switch fabric before the next segment is written into the queue. Under this scenario, each of the queues has either no segments or a single segment stored at a given time. The pipeline 82 has $S_p$ segments stored in the $S_p$ stages, after the pipeline 82 has had a chance to fill (after $S_p$ clock cycles).

When a particular switch fabric port becomes congested (e.g., due to filling of buffer space in the switch fabric 28 for data packets leaving the fabric on the output bus for that port), the switch fabric 28 notifies the fabric access modules 40 (over a control bus 52) to stop sending data for that port to the fabric. For incremental flow control, the switch fabric 28 first notifies the fabric access modules 40 to stop sending low-priority traffic when the switch fabric buffer reaches a low-priority threshold. As the switch fabric buffer reaches higher priority thresholds, the switch fabric 28 stops higher priority traffic. When a particular switch fabric port is no longer congested, the switch fabric 28 notifies the fabric access modules 40 to start sending data to the fabric again.

Different priority-based flow control schemes can be used at the switch fabric 28. The switch fabric 28 may stop low-priority traffic for a single congested port, or for all ports at the same time. The switch fabric flow control causes the traffic manager 38 to place a queue in the XON or XOFF state.

When the switch fabric 28 sends a flow control signal to the fabric access module 40 to stop sending from a particular queue, the number of segments stored in that queue increases. This increase in segments causes the fabric access module 40 to send a "backpressure" indicator to the traffic manager 38. The traffic manager 38 places that queue in the XOFF state so that the queue will not overflow. After the traffic manager 38 places the queue in the XOFF state and stops transmitting segments for that queue, the queue may continue to grow due to segments for that queue flushing out of the pipeline 82.

One approach to handling this pipeline flushing flow control latency is to include enough buffer space in each of the queues to absorb these segments. Each queue stores a maximum number of elements $S_q$ (each element holding one segment) where $S_q \geq S_p$. The buffer 66 has at least enough memory space for $NS_q$ segments.

When a queue has been placed in the XOFF state and is ready to be placed in the XON state, it is useful to have $S_p$ segments in that have been built-up in the queue since it may take $S_p$ clock cycles for a segment that is received by the traffic manager 38 to flow through the pipeline 82 and enter the queue. Without enough segments built-up in the queue, the queue may "underflow" missing a potential opportunity to send a segment to the switch fabric 28.

If the number of segments that will be in the queue after the pipeline 82 is flushed is not known, then in order to ensure that there are at least $S_p$ segments built-up in the queue after changing to the XOFF state, the queue should have a size of $S_q \geq 2S_p$. After the number of segments in the queue grows to $S_p$ segments, the traffic manager 38 places the queue in the XOFF state. If no segments are flushed into the queue, then there are $S_p$ segments built-up. However, there is enough buffer space in the queue to absorb $S_p$ more segments that may be flushed into the queue.

Another approach to handling the pipeline flushing flow control latency is to keep track of the number of segments that have been received by the traffic manager 38 for each queue, including those that are in the pipeline 82. A flow control module 84 uses circuitry (e.g., a field-programmable gate array (FPGA)) to transition between flow control XON and XOFF states for each queue. For each queue, the flow control module 84 maintains a count F of segments "in transit" from the input buffer 79 of the traffic manager 38 to the output of the fabric access module 40. The flow control module 84 executes a separate finite state machine (FSM) for each queue for determining the transitions between flow control states.

The count F of data segments in transit includes data segments in a queue of the traffic manager 38 and data segments in transit between the input buffer 79 and the queue. In this example, data segments in transit includes data segments in registers of the pipeline 82. The data segments in transit can include data segments in any of a variety of storage or communication devices that may be between the input buffer 79 and the queue. For example, the data segments in transit can include segments in a memory device (e.g., a scheduling pipeline, a frame modification pipeline, a data FIFO, or an intermediate queue with no flow control capability) or in a data communication system (e.g., a transmission system or a fabric system).

Figure 4:
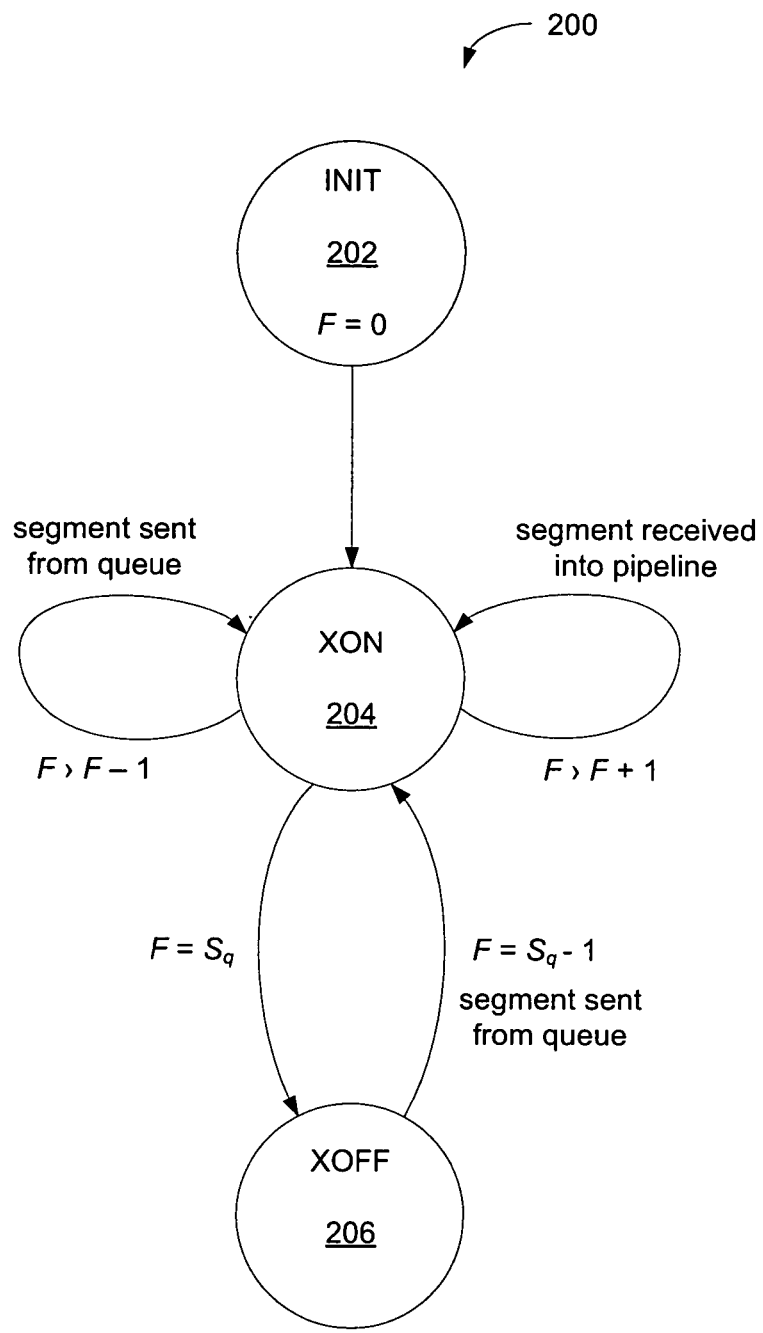
FIG. 4 is a state transition diagram for a finite state machine in a flow control module.

FIG. 4 shows a state transition diagram 200 for an FSM for one of the queues. The FSM starts in an INIT state 202 in which the flow control module initializes the count F of segments in transit for that queue to F=0. The FSM transitions to the XON state 204. When a segment is received by the traffic manager 38 into the pipeline 82, the traffic manager 38 sends a RECEIVED control signal over a control line 120 from the traffic manager 38 to the flow control module 84. The RECEIVED control signal indicates to which queue the segment corresponds. In response to the RECEIVED control signal, the FSM for the corresponding queue increments the value of F by 1.

When the fabric access module 40 sends a segment to the switch fabric 28, the control module 62 handling the buffer 66 sends a SENT control signal to the flow control module 84. The SENT control signal indicates from which queue the segment was sent. In response to the SENT control signal, the FSM for the corresponding queue decrements the value of F by 1. The SENT control signal also indicates the number of segments that are remaining in the queue (not including any segments that may still be in the pipeline 82). The flow control module 84 uses this number of segments remaining to perform a validation check of the state of the corresponding FSM and correct any errors detected.

When the value of F reaches $S_q$ the FSM transitions to the XOFF state 206. If the fabric access module 40 has stopped sending segments from the corresponding queue (due to a flow control signal from the switch fabric 28) then the total segments F in will not change until the fabric access module 40 starts sending from that queue again. When the fabric access module 40 starts sending again, the FSM decrements the value of F by 1 (in response to a SENT control signal) and transitions to the XON state 204. Changes in the state of a queue (as determined by the flow control module 84) are sent to the traffic manager 38 via control signals QUEUEID and QUEUESTATE that identify the queue and the state of the queue, respectively.

For this approach, a queue does not need to have a size (i.e., maximum number of elements) of $S_q \geq 2S_p$ in order to ensure that there are at least $S_p$ segments built-up in the queue after changing to the XOFF state. The size of a queue can be $S_q = S_p + S_l$ (with $S_l < S_p$), since the flow control module 84 keeps track of segments in the pipeline, reducing the flow control latency caused by the flushing of the queue. There may be a residual flow control latency that is taken into account by the additional number of queue elements $S_l$ (e.g., $S_l = 1$ or 2 elements).

Figure 5:
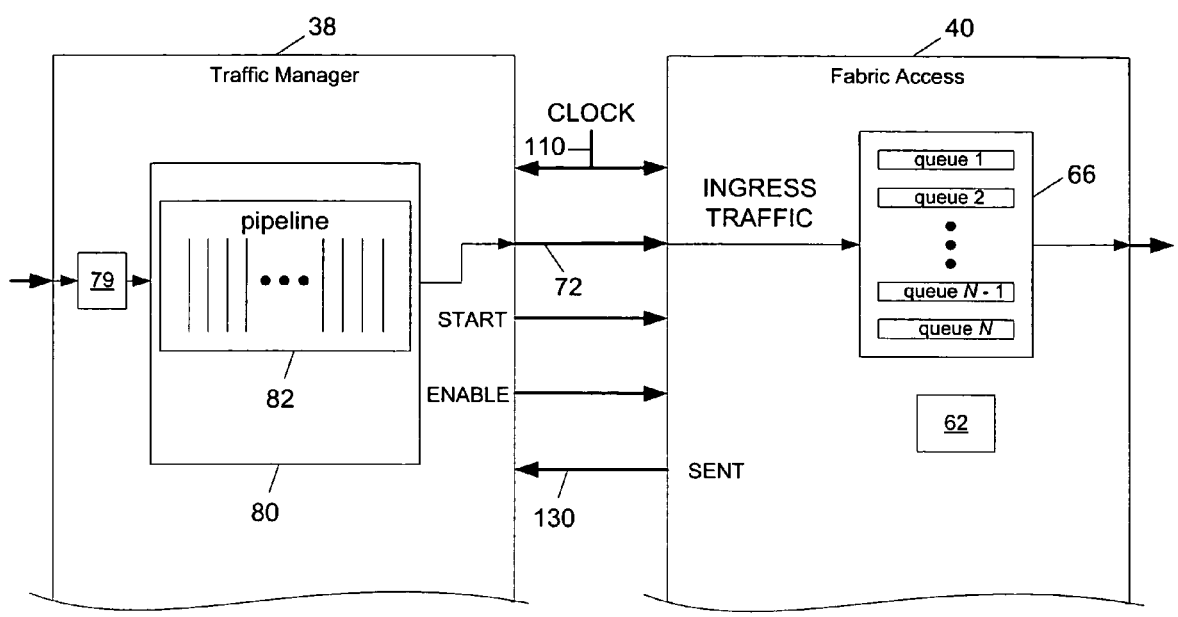
FIG. 5 is a block diagram of another example of a portion of an interface between a traffic manager and a fabric access module for handling ingress traffic to a switch fabric.

In an alternative example of the interface between the traffic manager 38 and a fabric access module 40, shown in FIG. 5, the flow control module 84 is incorporated into the control unit 80. In this example, the SENT control signal is sent over a control line 130 from the fabric access module 40 to the traffic manager 38. The control unit 80 performs the functions of the flow control module 84 as described above.

In an alternative to a switch fabric 28, the traffic manager 38 can control the flow of traffic to another type of device (e.g., a framer).

The tracking of data in transit and data stored in a queue can be extended to include a collection of queues where the total data in transit for the collection of queues and the total number of data segment stored in the collection of queues can be tracked allowing flow control of the collection of queues through a single XON/OFF control.

Other embodiments are within the scope of the following claims.

What is claimed is:

1. A method comprising:
   maintaining a count of data segments, the count including data segments in a queue and data segments in transit between a data source and the queue; and
   controlling a flow of data segments from the data source, based on a value of the count.

2. The method of claim 1 wherein the queue is one of a plurality of queues stored in a memory buffer.

3. The method of claim 2 further comprising maintaining counts of data segments for each of the queues.

4. The method of claim 3 wherein controlling the flow of data segments comprises accepting a data segment for a designated one of the queues from the data source only when the count for the designated queue is less than a predetermined number.

5. The method of claim 4 wherein the predetermined number is equal to the number of elements in the designated queue.

6. The method of claim 2 wherein all of the queues have the same number of elements.

7. The method of claim 1 wherein the data source comprises an input buffer.

8. The method of claim 1 wherein the data segments in transit comprise data segments in a data pipeline of a device that reads data segments from the data source.

9. The method of claim 1 wherein maintaining the count comprises:
   incrementing the count when a data segment leaves the data source; and
   decrementing the count when a data segment leaves the queue.

10. The method of claim 1 wherein the queue has at least as many elements as a maximum number of data segments in transit.

11. The method of claim 1 wherein the queue has fewer elements than twice a maximum number of data segments in transit.

12. An apparatus comprising:
   a data source;
   a memory buffer in communication with the data source and storing a queue; and
   circuitry configured to
      maintain a count of data segments, the count including data segments in the queue and data segments in transit between the data source and the queue; and
      control a flow of data segments from the data source, based on a value of the count.

13. The apparatus of claim 12 wherein the queue is one of a plurality of queues stored in the memory buffer.

14. The apparatus of claim 13 wherein the circuitry is further configured to maintain counts of data segments for each of the plurality of queues.

15. The apparatus of claim 12 wherein the data segments in transit comprise data segments in a data pipeline of a device that reads data segments from the data source.

16. The apparatus of claim 12 wherein maintaining the count comprises:
   incrementing the count when a data segment leaves the data source; and
   decrementing the count when a data segment leaves the queue.

17. The apparatus of claim 12 wherein the queue has at least as many elements as a maximum number of data segments in transit.

18. The apparatus of claim 12 wherein the queue has fewer elements than twice a maximum number of data segments in transit.

19. A system comprising:
   a first buffer;
   a processor having a data pipeline in communication with the first buffer;
   a second buffer in communication with the processor and storing a queue;
   one or more communication lines in communication with the first buffer;
   a switch fabric in communication with the second buffer; and
   circuitry configured to
      maintain a count of data segments, the count including data segments in the queue and data segments in transit between a data source and the queue; and control a flow of data segments from the data source, based on a value of the count.

20. The system of claim 19 wherein the data segments in transit comprise data segments in the data pipeline.

21. The system of claim 19 wherein maintaining the count comprises:
incrementing the count when a data segment leaves the data source; and
decrementing the count when a data segment leaves the queue.

22. The system of claim 19 wherein the queue has at least as many elements as a maximum number of data segments in transit.

23. The system of claim 19 wherein the queue has fewer elements than twice a maximum number of data segments in transit.

24. A processor comprising:
a data pipeline configured to communicate with a data source; and
circuitry configured to
maintain a count of data segments, the count including data segments in a queue and data segments in transit between the data source and the queue; and
control a flow of data segments from the data source, based on a value of the count.

25. The processor of claim 24 wherein the circuitry is further configured to:
increment the count when a data segment leaves the data source; and
decrement the count when a data segment leaves the queue.

26. The processor of claim 24 wherein the queue has at least as many elements as a maximum number of data segments in transit.

27. The processor of claim 24 wherein the queue has fewer elements than twice a maximum number of data segments in transit.

* * * * *